US012671888B2

(12) United States Patent
Li et al.

(10) Patent No.: US 12,671,888 B2
(45) Date of Patent: Jun. 30, 2026

(54) CAMERA LENS MODULE, CAMERA LENS OPTICAL AXIS ADJUSTING DEVICE, AND BINOCULAR CAMERA

(71) Applicant: ZHEJIANG UNIVIEW TECHNOLOGIES CO., LTD., Hangzhou (CN)

(72) Inventors: Zengqiang Li, Hangzhou (CN); Yuliang Qin, Hangzhou (CN); Zhourong Xu, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 197 days.

(21) Appl. No.: 18/584,345

(22) Filed: Feb. 22, 2024

(65) Prior Publication Data

US 2024/0244309 A1     Jul. 18, 2024

Related U.S. Application Data

(63) Continuation-in-part of application No. PCT/CN2022/106004, filed on Jul. 15, 2022.

(30) Foreign Application Priority Data

Aug. 25, 2021    (CN) .......................... 202110980242.1

(51) Int. Cl.
*H04N 23/55*         (2023.01)
(52) U.S. Cl.
CPC ................................... *H04N 23/55* (2023.01)
(58) Field of Classification Search
CPC ........ H04N 23/55; H04N 23/45; G02B 7/023; G02B 7/021
See application file for complete search history.

(56) References Cited

U.S. PATENT DOCUMENTS

2006/0215021 A1* 9/2006 Suto ..................... H04N 13/246
                                                          348/E13.016
2018/0020206 A1* 1/2018 Sheridan .............. H04N 13/327
2024/0019768 A1* 1/2024 Ding ........................ G02B 7/14

FOREIGN PATENT DOCUMENTS

CN          13929589 A      7/2014
CN          106595594 A      4/2017
                    (Continued)

OTHER PUBLICATIONS

International Search Report in Application No. PCT/CN2022/106004, dated Oct. 20, 2022, 5 pages, including translation.

(Continued)

*Primary Examiner* — Abdelaaziz Tissire
(74) *Attorney, Agent, or Firm* — MASCHOFF BRENNAN

(57)                ABSTRACT

A camera lens module includes a mount, a first lens, a second lens, and an adjusting mechanism. The first lens is fixedly mounted on the mount. The adjusting mechanism includes an adjusting substrate and a pitching adjusting assembly. A first support pillar is disposed on the adjusting substrate. The first support pillar is connected to the mount. The second lens is fixedly disposed on the front surface of the adjusting substrate. The axis of the first support pillar and the optic axis of the first lens are disposed on the same z-axis. The optic axis of the second lens is collinearly disposed with the axis of the first support pillar. The other end of the adjusting substrate is connected to the mount through the pitching adjusting assembly and is configured to adjust the pitch angle of the optic axis of the second lens around an x-axis and a y-axis.

19 Claims, 6 Drawing Sheets

(56)                       References Cited

FOREIGN PATENT DOCUMENTS

| CN | 107333036 | A |   | 11/2017 |
|----|-----------|---|---|---------|
| CN | 208353463 | U |   | 1/2019  |
| CN | 111083470 | A |   | 4/2020  |
| CN | 111610638 | A |   | 9/2020  |
| CN | 112130273 | A |   | 12/2020 |
| CN | 212180654 | U |   | 12/2020 |
| CN | 112929553 | A |   | 6/2021  |
| CN | 113030921 | A |   | 6/2021  |
| CN | 213342365 | U | * | 6/2021  |
| CN | 114200624 | A |   | 3/2022  |
| JP | 2009288612 | A |   | 12/2009 |
| JP | 2014039096 | A |   | 2/2014  |
| WO | WO2020/194564 | A1 |   | 10/2020 |

OTHER PUBLICATIONS

Chinese Office Action in Application No. 202110980242.1, dated
Mar. 12, 2024, 16 pages including translation.

* cited by examiner

1

CAMERA LENS MODULE, CAMERA LENS OPTICAL AXIS ADJUSTING DEVICE, AND BINOCULAR CAMERA

CROSS-REFERENCE TO RELATED APPLICATIONS

This application is a continuation-in-part of International Patent Application No. PCT/CN2022/106004, filed on Jul. 15, 2022, which claims priority to Chinese Patent Application No. 202110980242.1 filed on Aug. 25, 2021, the disclosures of which are incorporated herein by reference in their entireties.

TECHNICAL FIELD

The present application relates to the field of binocular stereoscopic vision technology, for example, a camera lens module, a camera lens optic axis adjusting device, and a binocular camera.

BACKGROUND

A binocular camera has two lenses, which are able to acquire image information closer to reality. Thus, the binocular camera is increasingly popular in the market. A binocular camera has two lenses and can acquire two images at the same time. The two images are registered by using image signal processing (ISP) technology and finally fused to form one image and output. The two lenses of the binocular camera acquire different information about a monitoring environment. A color lens acquires image color information, and a black and white lens acquires image brightness information. The finally acquired fusion image improves the detail performance and signal-to-noise ratio of an image while retaining the image color information, thereby improving the image quality in a low illuminance environment at night.

Image fusion is intended for the public region where two imaging images overlap, while other non-overlapping images need to be cropped. For a binocular camera, the field of view range of two lenses and the consistency of imaging images determine the effect and resolution of a final fused image. Thus, for a binocular camera, the deviation of the relative parallelism of the optic axes of two lenses is required to be as small as possible to ensure the imaging consistency of the two lenses and the image fusion effect. However, there must be certain common differences in the processing and assembly of the two lenses. After the two lenses are assembled to the binocular camera, the accuracy of the optic axis positions of the two lenses cannot be ensured.

SUMMARY

The present application provides a camera lens module, a camera lens optic axis adjusting device, and a binocular camera.

A camera lens module includes a mount, a first lens, a second lens, and an adjusting mechanism.

The first lens is fixedly mounted on the mount. The optic axis of the first lens extends in a z-axis direction.

The adjusting mechanism includes an adjusting substrate and a pitching adjusting assembly. A first support pillar is disposed on the back surface of an end of the adjusting substrate. The first support pillar is connected to the mount. The second lens is fixedly disposed on the front surface of the adjusting substrate. The second lens and the first lens are disposed at intervals along an x-axis direction. The axis of the first support pillar and the optic axis of the first lens are disposed on the same z-axis. The optic axis of the second lens is collinearly disposed with the axis of the first support pillar. The other end of the adjusting substrate is connected to the mount in a floating manner through the pitching adjusting assembly and is configured to adjust the pitch angle of the optic axis of the second lens around an x-axis and a y-axis.

A camera lens optic axis adjusting device includes the preceding camera lens module and an adjusting reference member.

The adjusting reference member is provided with two adjusting reference marks. The two adjusting reference marks correspond to the first lens and the second lens respectively.

A binocular camera includes the preceding camera lens module.

REFERENCE LIST

Figure 1:
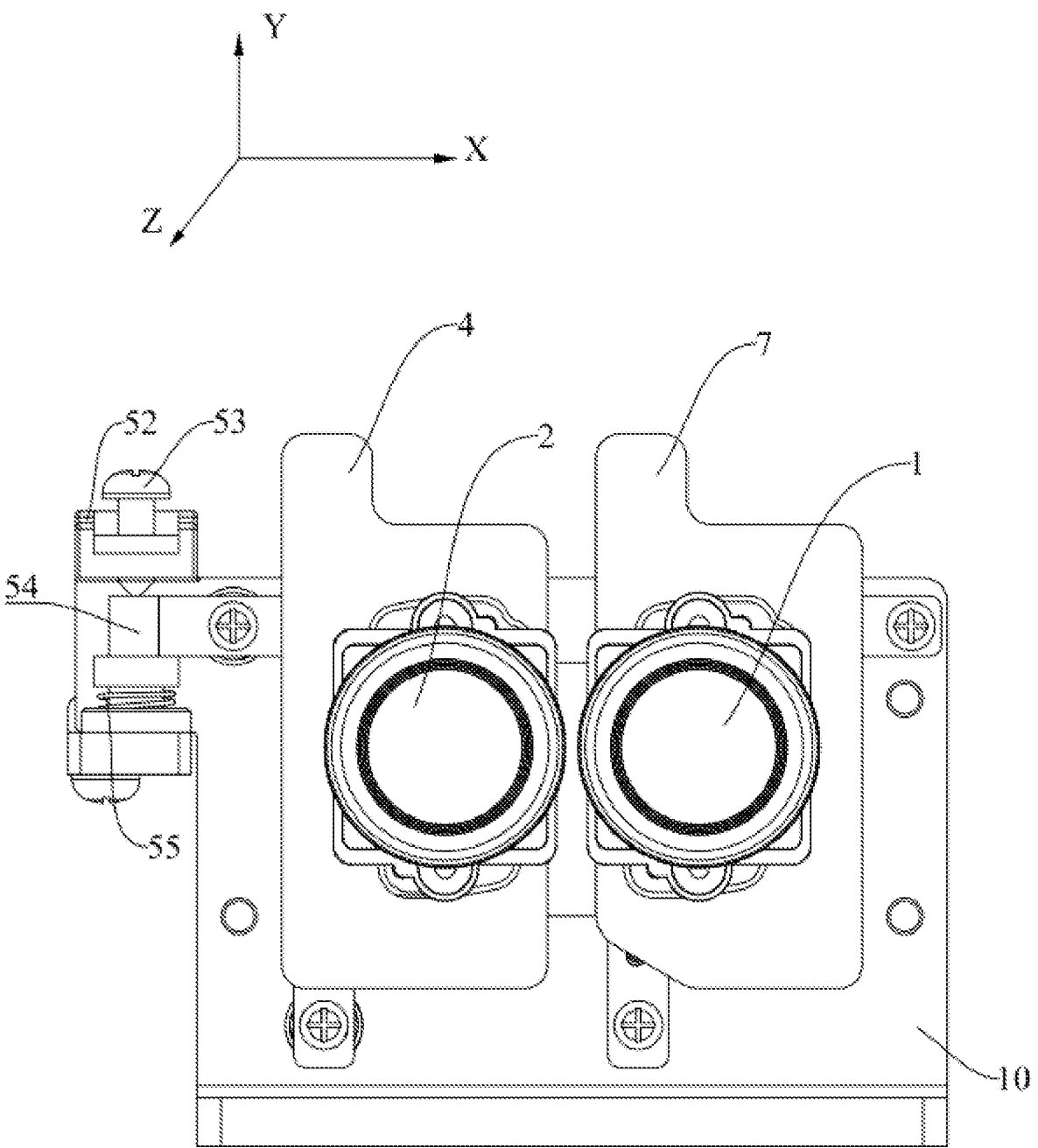
FIG. 1 is a front view of a camera lens module according to an embodiment of the present application.

10 mount
101 second support pillar
102 positioning pillar
1 first lens
2 second lens
31 adjusting substrate
311 first support pillar
321 first adjusting structure
3211 first adjusting support pillar
3212 first adjusting elastic member
3213 first adjusting connection member
322 second adjusting structure
3221 second adjusting support pillar
3222 second adjusting elastic member
3223 second adjusting connection member
4 second imaging sensor board
41 second imaging element
51 rotating shaft
511 optic axis portion
512 stop portion
513 threaded shaft portion
514 fastening elastic member
52 mounting bracket
521 pressing block
53 tightening screw
54 adjusting cantilever

541 first rotation angle stop waist-shaped hole
55 rotation angle adjusting spring
56 limit cantilever
561 second rotation angle stop waist-shaped hole
6 adjusting reference member
61 adjusting reference mark
7 first imaging sensor board
71 first imaging element
8 fixed substrate
91 mainboard
92 fixed platform
93 flexible flat cable (FFC) line
94 motherboard bracket

DETAILED DESCRIPTION

The technical solutions of the present application are described hereinafter in conjunction with drawings and embodiments. Specific embodiments described herein are merely intended to explain the present application. For ease of description, only parts related to the present application are illustrated in the drawings.

In the description of the present application, the orientations or position relations indicated by terms such as "center", "above", "below", "left", "right", "vertical", "horizontal", "inside", and "outside" are based on orientations or position relations shown in the drawings. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. In addition, terms such as "first" and "second" are used only for the purpose of description and are not to be construed as indicating or implying relative importance. Terms "first position" and "second position" are two different positions.

In the description of the present application, unless otherwise specified and limited, the term "mounting", "connected to each other", or "connected" is to be construed in a broad sense, for example, as securely connected or detachably connected; mechanically connected or electrically connected; directly connected to each other or indirectly connected to each other via an intermediary; or internally connected between two elements. For those of ordinary skill in the art, meanings of the preceding terms may be understood according to situations in the present application.

As a key input device of a video monitoring system, a camera is particularly important for acquiring image information of an external monitoring environment. The image quality of imaging of the camera is closely related to the illumination condition of the environment. Generally, the camera is used as an electronic device that works around the clock. In a low illuminance environment at night, the brightness of an image acquired is insufficient, and the signal-to-noise ratio of the image is very poor. As a result, it is difficult to obtain high-quality image information.

Insufficient environment illumination at night may affect the quality of the image acquired by the camera at night. To avoid insufficient environment illumination at night, the camera generally has a white light or an infrared light to fill light. However, the image acquired by an infrared fill light is a black and white image, important color information may be lost, the accuracy of monitoring and recognition is affected. While a high-power white light is used to fill light, although the brightness and color of the image acquired are ideal, glare may be caused to human eyes, and serious white light pollution problems may be caused. To satisfy the requirements of all-weather color monitoring of the camera and avoid light pollution, a binocular camera is generally used.

Referring to FIGS. 1 to 5, the present application provides a binocular camera.

Figure 4:
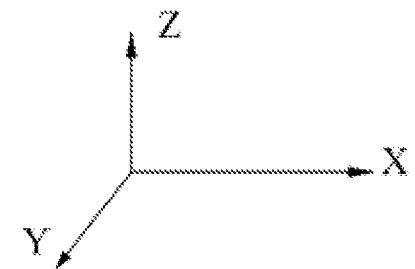
FIG. 4 is a diagram illustrating the mounting structure of a first lens and a second lens on a mount according to an embodiment of the present application.
Figure 4:
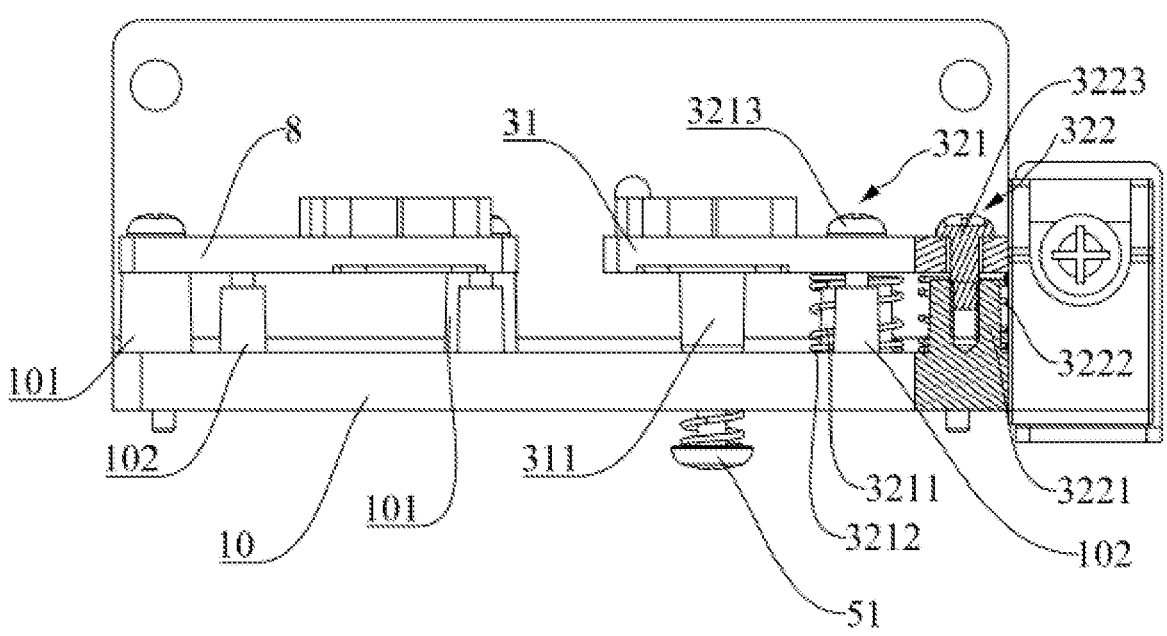

The binocular camera includes a camera lens module. The camera lens module includes a first lens 1, a second lens 2, and a mount 10. The first lens 1 and the second lens 2 are mounted on the mount 10. The first lens 1 is fixedly mounted on the mount 10. The optic axis of the first lens 1 extends in a z-axis direction (hereinafter referred to as the Z-axis) as shown in FIG. 4.

The first lens 1 and the second lens 2 can acquire two images at the same time, register the two images, and finally fuse the two images into one image for output. The first lens 1 and the second lens 2 acquire different information about a monitoring environment. One of the two is a color lens to acquire image color information, and the other of the two is a black and white lens to acquire image brightness information. In this manner, the finally acquired fusion image improves the detail performance and signal-to-noise ratio of the image while retaining the image color information, thereby improving the image quality in a low illuminance environment at night.

In some embodiments of the present application, one lens of the first lens 1 and the second lens 2 is in a running state and the other one of the first lens 1 and the second lens 2 is in a dormant or off state.

When the optic axis of the first lens 1 and the optic axis of the second lens 2 are parallel to each other, the accuracy of the fused image of the two lenses can reach an ideal state. However, due to the first lens 1 and the second lens 2 need to go through the processing, assembly and other processes, it is a higher probability that there is some deviation between the optical axes corresponding to the first lens 1 and the second lens 2, so that the optic axes of the two are actually not parallel, which may cause positional deviations in the center points of the two images when reflected on the image. Thus, the relative parallelism of the first lens 1 and the second lens 2 needs to be adjusted.

In some embodiments of the present application, it can be understood that after the first lens 1 and the second lens 2 have been processed, assembled, and so on, the deviation between the parallelism of the optical axes corresponding to the first lens 1 and the second lens 2 is not very large and there will not be a large spatial difference in parallelism between the optical axes corresponding to the two lenses. For example, the spatial difference in parallelism between optical axes corresponding to the first lens 1 and the second lens 2 will be no more than 10°. It can be understood that if the deviation between the parallelism of the optical axes corresponding to the first lens 1 and the second lens 2 is very large, it is not allowed to perform adjusting process on the corresponding device.

To accurately adjust the optic axis of the first lens 1 and the optic axis of the second lens 2 to be parallel to each other, in this embodiment, the binocular camera also includes an adjusting mechanism. In an embodiment, the adjusting mechanism is used for adjusting the lens in small scale.

Figure 3:
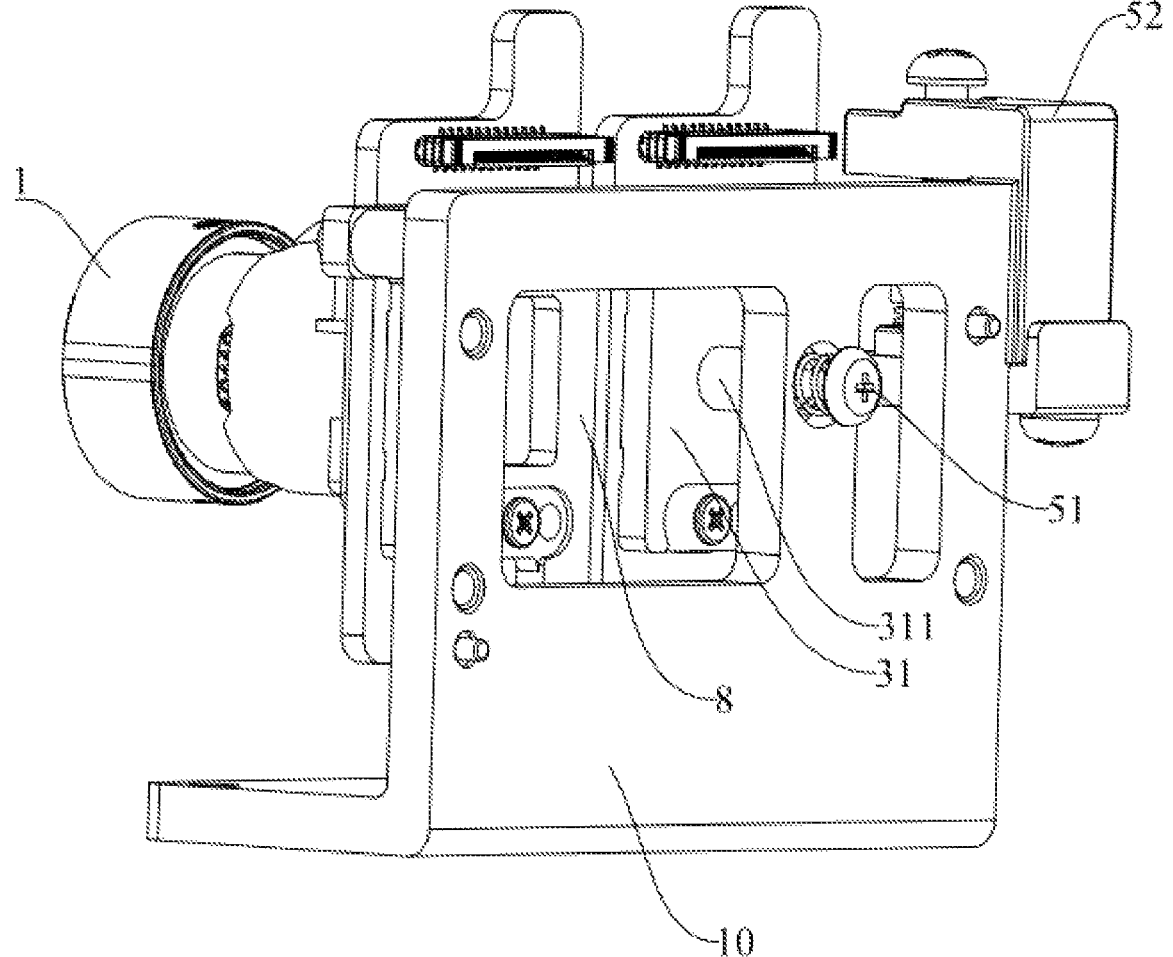
FIG. 3 is a view from a three-dimensional viewing angle of a camera lens module according to an embodiment of the present application.

In some embodiments of present application, referring to FIGS. 3 and 4, the adjusting mechanism includes an adjusting substrate 31 and an adjusting assembly. The adjusting assembly is configured to adjust the optic axis of the second lens 2 to enable the optic axis of the first lens 1 and the optic axis of the second lens 2 to be parallel to each other. In an embodiment, the adjusting assembly includes a pitching adjusting assembly. A first support pillar 311 is disposed on a side of the adjusting substrate 31. The first support pillar 311 is capable of being in contacting with the mount 10. The second lens 2 is fixed to the other side of the adjusting substrate 31. The second lens 2 and the first lens 1 are disposed at intervals along an x-axis direction (hereinafter referred to as the X-axis) as shown in the FIG. 4, so that the second lens 2 can be indirectly adjusted to accomplish the adjustment of the optical axis corresponding to the second lens 2 by affecting the adjusting substrate 31.

In some embodiment of present application, it can be understood that the first lens 1 can be provided on a relatively fixed substrate so as to adjust only the orientation of the optical axis corresponding to the second lens 2 to accomplish the tuning of the parallelism of the first lens 1 and the second lens 2. In another embodiment, the first lens 1 can also be provided on another adjusting substrate, and the present application does not limit this.

In some embodiment of present application, the adjusting cantilever 54 of the adjusting substrate 31 is connected to the mount 10 in a floating manner through the pitching adjusting assembly to adjust the pitch angle of the optic axis of the second lens 2 around an x-axis and a y-axis (hereinafter referred to as the Y-axis) as shown in the FIG. 4.

In some embodiment of present application, referring to FIG. 4, the connection in the floating manner in the present application, can be understood as a connection including a connection member and a resilient member provided in pairs. By means of the resilient member against a structural member, the relevant structural member is capable to be maintained in a particular state or position by virtue of the elastic force of the resilient member and the holding force of the connection member after withdrawal of the intervention of an external force.

In some embodiment of present application, in the camera lens module provided in this embodiment, the first lens 1 is fixedly mounted on the mount 10, and the optic axis of the first lens 1 extends in the z-axis direction, so that it is ensured that the optic axis position of the first lens 1 is fixed. The second lens 2 is fixedly disposed on the adjusting substrate 31. By adjusting the position angle of the adjusting substrate 31, the position angle of the optic axis of the second lens 2 can be adjusted.

The second lens 2 is mounted on the mount 10 in a floating manner through the adjusting substrate. The second lens 2 and the first lens 1 are disposed at intervals along the x-axis direction. The first support pillar 311 is the assembly pivot of the adjusting substrate 31. The axis of the first support pillar 311 and the optic axis of the first lens 1 both extend along the z-axis. With this disposition, it can be ensured that the optic axis of the second lens 2 is flush with the optic axis of the first lens 1 after the optic axis of the second lens 2 is adjusted. In addition, the pitch angle of the optic axis of the second lens 2 around the x-axis and the y-axis can be adjusted through the pitching adjusting assembly. Thus, the relative parallelism of the optic axis of the second lens 2 and the optic axis of the first lens 1 can be adjusted to ensure the imaging accuracy.

Figure 5:
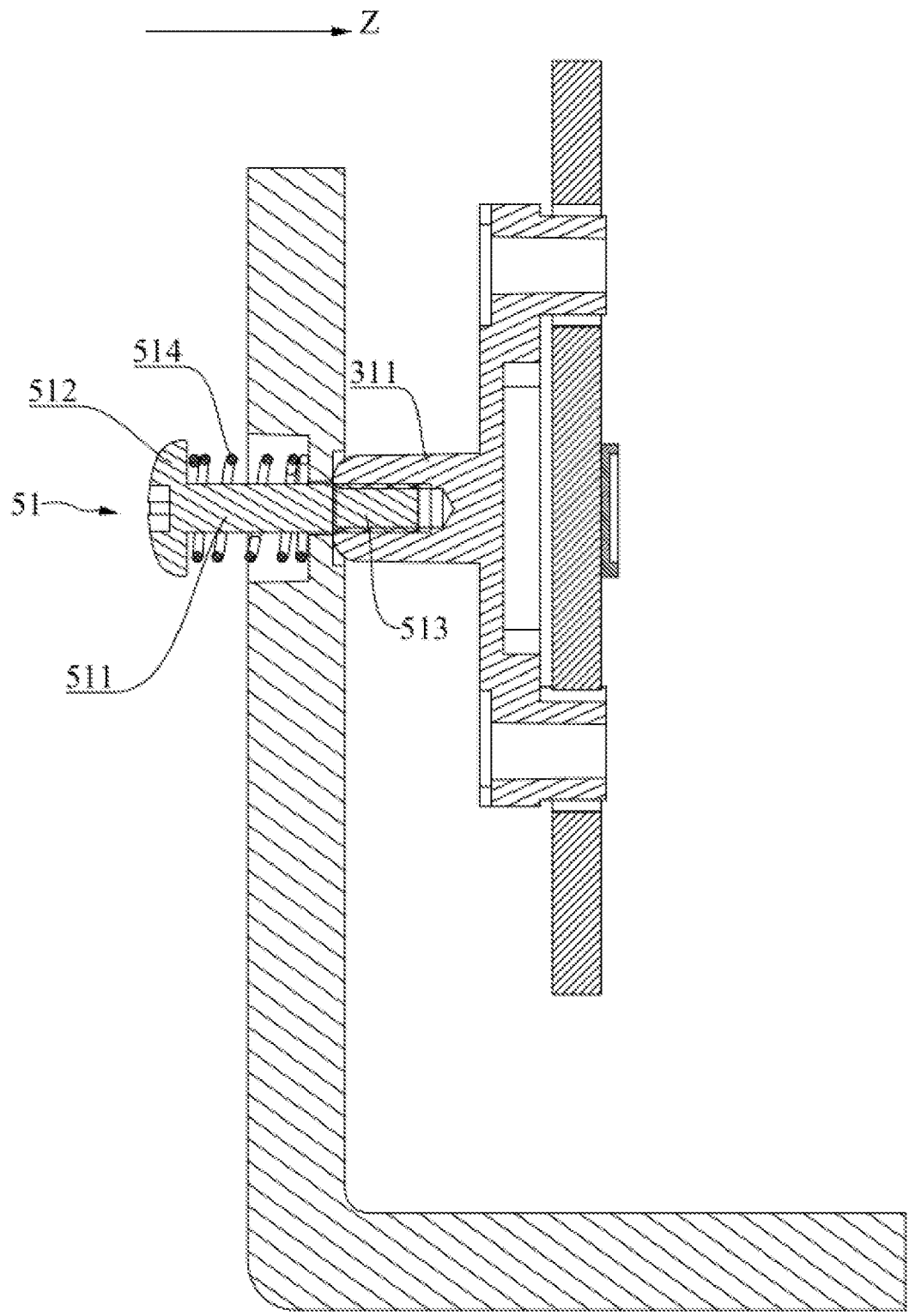
FIG. 5 is a diagram illustrating the mounting structure of an adjusting substrate on a mount according to an embodiment of the present application.

In some embodiment of the present application, referring to FIGS. 4-5, the assembly pivot of the adjusting substrate 31 in the present application, can be understood that the first support pillar 311 is disposed on one side of the adjusting substrate 31 facing the mount 10, so that the adjusting substrate 31 is assembled to the mount 10 by means of the first support post 311, that is, the first support pillar 311 can be removably disposed in a corresponding region of the mount 10. In the process of assembling, the axis of the first support pillar 311 and the optic axis of the second lens 2 coincide with each other, so that the impact on the orientation of the optical axis of the second lens 2 can be maximized when affecting the orientation of the adjusting substrate 31.

In some embodiment of the present application, if the axis of the first support pillar 311 does not coincide with the optic axis of the second lens 2, so that the adjustment of the orientation of the optical axis of the second lens 2 can also be carried out while affecting the orientation of the adjusting substrate 31.

In some embodiments of the present application, referring to FIGS. 4 to 5, it can be understood that a chamfer exists on the end surface of the first support pillar 311 in contact with the mount 10. By providing the corresponding chamfer, the adjusting substrate 31 can be kept in a relatively tilted state after adjusting the adjusting substrate 31.

In some embodiments of the present application, it is known that the fillet corner is also a kind of chamfered corner.

In some embodiments of the present application, referring to FIGS. 2 to 5, an adjusting cantilever 54 is disposed on one side of the adjusting substrate 31 facing away from the first lens 1. The pitching adjusting assembly includes a first adjusting structure 321 and a second adjusting structure 322. The first adjusting structure 321 and the second adjusting structure 322 are disposed at intervals along an x-axis direction in sequence. The first adjusting structure 321 and the second adjusting structure 322 can both act on the adjusting substrate 31 to adjust the orientation of the adjusting substrate 31. In addition, the first adjusting structure 321 is more adjacent to the first support pillar 311 than the second adjusting structure 322. With this disposition, based on that the length of a first lever arm formed while the first adjusting structure 321 acts on the adjusting cantilever 54 is smaller than the length a second lever arm length formed while the second adjusting structure 322 acts on the adjusting cantilever 54, the first adjusting structure 321 mainly affects the pitch angle of the optic axis of the second lens 2 around the x-axis, the second adjusting structure 322 mainly affects the pitch angle of the optic axis of the second lens 2 around the y-axis.

Figure 2:
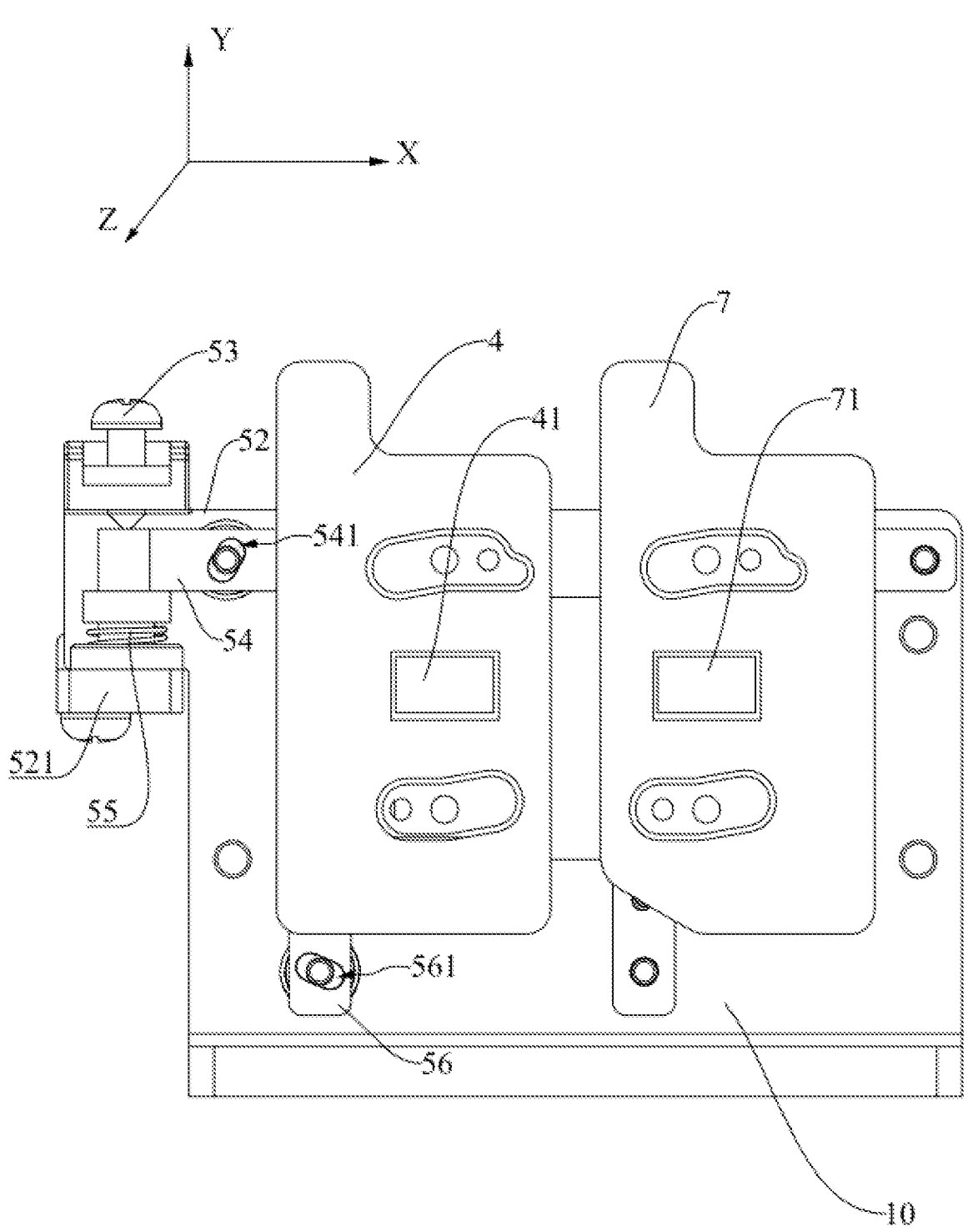
FIG. 2 is a diagram after a first lens and a second lens are hidden in FIG. 1.

In some embodiments of the present application, referring to FIG. 2, the adjusting cantilever 54 is provided on, a side of the adjusting substrate 31 relatively facing away from the centerline of the adjusting substrate 31 in the X-axis direction to allow the first adjusting structure 321 to have a greater effect on the pitch angle of the optical axis of the second lens 2 about the X-axis.

In some embodiments of the present application, two adjusting cantilevers are provided on the side of the adjusting substrate 31 facing away from the first lens 1, and the first adjusting structure 321 and the second adjusting structure 322 act on different adjusting cantilevers respectively.

In some embodiments of the present application, the first adjusting structure 321 includes a first adjusting support pillar 3211, a first adjusting elastic member 3212, and a first adjusting connection member 3213.

The first adjusting support pillar 3211 is fixedly mounted on the mount 10. A gap exists between the end surface of the first adjusting support pillar 3211 and the adjusting substrate 31. That is, the axial dimension of the first adjusting support pillar 3211 is less than the axial dimension of the first support pillar 311, so that there is an adjustment margin for the adjusting substrate 31. The first adjusting elastic member 3212 sleeves the periphery of the first adjusting support pillar 3211. One end of the first adjusting elastic member 3212 abuts against the mount 10, and the other end of the first adjusting elastic member 3212 abuts against the adjusting substrate 31. The first adjusting connection member 3213 connects the adjusting substrate 31 and the first adjusting support pillar 3211 and can adjust the distance between the end surface of the first adjusting support pillar 3211 and the adjusting substrate 31.

In some embodiments of the present application, the first adjusting connection member 3213 is a screw. A first threaded hole that cooperates with the first adjusting connection member 3213 is disposed in the first adjusting support pillar 3211. The first adjusting connection member 3213 extends through the adjusting substrate 31 and is threadedly screwed into the first threaded hole of the first adjusting support pillar 3211, and the nut of the first adjusting connection member 3213 always abuts against the adjusting substrate 31. In an embodiment, a first unthreaded hole that cooperates with the first adjusting connection member 3213 is formed on the adjusting substrate 31. The aperture of the first unthreaded hole is slightly greater than the radius of the threaded shaft of the first adjusting connection member 3213.

When it is necessary to adjust the pitch angle of the optic axis of the second lens 2 around the x-axis, the first adjusting connection member 3213 is screwed to adjust the length of the threaded connection of the first adjusting connection member 3213 in the first threaded hole. When the length of the threaded connection becomes longer, the nut of the first adjusting connection member 3213 drives the adjusting substrate 31 to approach the first adjusting support pillar 3211. At the same time, the first adjusting elastic member 3212 is compressed and provides an elastic support force to the adjusting substrate 31, so that the adjusting substrate 31 can float and reach a balanced state. When the length of the threaded connection becomes shorter, the nut of the first adjusting connection member 3213 drives the adjusting substrate 31 away from the first adjusting support pillar 3211, the first adjusting elastic member 3212 abuts against the adjusting substrate 31 under the action of an elastic restoring force and provides an elastic support force to the adjusting substrate 31, so that the adjusting substrate 31 can float and reach a balanced state.

The structure of the second adjusting structure 322 is the same as the structure of the first adjusting structure 321. The second adjusting structure 322 includes a second adjusting support pillar 3221, a second adjusting elastic member 3222, and a second adjusting connection member 3223.

The second adjusting support pillar 3221 is fixedly mounted on the mount 10. A gap exists between the end surface of the second adjusting support pillar 3221 and the adjusting substrate 31. That is, the axial dimension of the second adjusting support pillar 3221 is less than the axial dimension of the first support pillar 311, so that there is an adjustment margin for the adjusting substrate 31. The second adjusting elastic member 3222 sleeves the periphery of the second adjusting support pillar 3221. One end of the second adjusting elastic member 3222 abuts against the mount 10, and the other end of the second adjusting elastic member 3222 abuts against the adjusting substrate 31. The second adjusting connection member 3223 connects the adjusting substrate 31 and the second adjusting support pillar 3221 and can adjust the distance between the end surface of the second adjusting support pillar 3221 and the adjusting substrate 31.

The second adjusting connection member 3223 is a screw. A second threaded hole that cooperates with the second adjusting connection member 3223 is disposed in the second adjusting support pillar 3221. The second adjusting connection member 3223 extends through the adjusting substrate 31 and is threadedly screwed into the second threaded hole of the second adjusting support pillar 3221, and the nut of the second adjusting connection member 3223 always abuts against the adjusting substrate 31. In an embodiment, a second unthreaded hole that cooperates with the second adjusting connection member 3223 is formed on the adjusting substrate 31. The aperture of the second unthreaded hole is slightly greater than the radius of the threaded shaft of the second adjusting connection member 3223.

The method for adjusting the pitch angle of the optic axis of the second lens 2 around the y-axis is the same as the method for adjusting the pitch angle of the optic axis of the second lens 2 around the x-axis, and the details are not repeated here.

The first adjusting structure 321 cooperates with the second adjusting structure 322. The threadedly screwed depth of the first adjusting connection member 3213 and the threadedly screwed depth of the second adjusting connection member 3223 are controlled, and the first adjusting elastic member 3212 and the second adjusting elastic member 3222 cooperate to implement the change in the angle of the adjusting substrate 31 relative to an assembly pivot. In this manner, the pitch angle of the optic axis of the second lens 2 around the x-axis and the pitch angle of the optic axis of the second lens 2 around the y-axis are adjusted, so that the optic axis of the second lens 2 can be adjusted to be parallel to the optic axis of the first lens 1.

The camera lens module also includes a first imaging sensor board 7 and a fixed substrate 8. A first imaging element 71 is disposed on the first imaging sensor board 7. The first lens 1 is mounted on the first imaging sensor board 7. The optic center of the first lens 1 overlaps the optic center of the first imaging element 71. The first imaging sensor board 7 is fixedly mounted on the fixed substrate 8, and the fixed substrate 8 is fixedly mounted on the mount 10.

To ensure the mounting stability of the fixed substrate 8 and the adjusting substrate 31 on the mount 10, in this embodiment, a positioning pillar 102 is also disposed on the mount 10 to support the fixed substrate 8 and the adjusting substrate 31.

The positioning pillar 102 is integrally formed on the mount 10 and includes a large-diameter segment. One end of the large-diameter segment is connected to the mount 10, and a small-diameter segment is disposed on the other end of the large-diameter segment.

In some embodiments of the present application, corresponding to the fixed substrate 8, two positioning pillars 102 are disposed on the mount 10. A first positioning blind hole that cooperates with the small-diameter segment of a positioning pillar 102 is disposed on the fixed substrate 8, and the depth of the first positioning blind hole is less than the axial dimension of the small-diameter segment. The bottom surface of the first positioning blind hole abuts against the small-diameter segment of the positioning pillar 102.

In some embodiments of the present application, corresponding to the adjusting substrate 31, a positioning pillar 102 is disposed on the mount 10. A second positioning blind hole that cooperates with the small-diameter segment of the positioning pillar 102 is disposed on the adjusting substrate 31, and the depth of the second positioning blind hole is less than the axial dimension of the small-diameter segment. When the adjusting substrate 31 floats relative to the mount 10, the side surface of the second positioning blind hole can cooperate with the side surface of the small-diameter segment to limit the position of the adjusting substrate 31 relative to the z-axis.

In some embodiments of the present application, the first adjusting elastic member 3212 and the second adjusting elastic member 3222 are compression springs.

After the optic axis parallelism of the first lens 1 and the second lens 2 is adjusted to an ideal state, it can be ensured that the center of an image is consistent in a y-axis direction, and the spacing in the x-axis direction is the calibration distance between the optic axis of the first lens 1 and the optic axis of the second lens 2.

Referring to FIGS. 1 and 2, the first imaging element 71 and a second imaging element 41 are configured to correspond to the first lens 1 and the second lens 2 respectively. Optionally, in this embodiment, the first imaging element 71 and the second imaging element 41 are sensors.

Dual lenses cooperate with dual imaging elements to acquire two images at the same time. ISP technology is used to register the two images and finally fuse the two images into one image for output.

In some embodiments of the present application, the mount 10 is also provided with two second support pillars 101 that cooperate with the fixed substrate 8. The fixed substrate 8 abuts against a second support pillar 101. Two fastening screws extend through the fixed substrate 8 and the second support pillar 101 in sequence to fixedly mount the fixed substrate 8 on the mount 10.

The first lens 1 includes a first lens body and a first lens holder. The first lens body is mounted on the first lens holder. The first imaging sensor board 7 and the fixed substrate 8 are dispensed and fixed as one body, and the optic center of the first lens body overlaps the optic center of the first imaging element 71. The fixed substrate 8 is fastened to the first lens holder through screws. At this time, the first lens 1, the first imaging sensor board 7, and the fixed substrate 8 are a whole body, and the whole body is fixed on the mount 10, so that the positions of the first lens 1 and the first imaging element 71 are fixed. Thus, the optic axis of the first lens 1 and the center position of the first imaging element 71 are fixed and serve as an adjustment reference.

When the optic center of the second lens 2 is in an initial state (that is, when the optic axis position of the second lens 2 is not adjusted), the optic center of the second lens 2 coincides with the optic center of the second imaging element 41.

In some embodiments of the present application, the camera lens module also includes a second imaging sensor board 4. The second imaging element 41 is disposed on the second imaging sensor board 4. The second imaging sensor board 4 is disposed on the front surface of the adjusting substrate 31. The second lens 2 is mounted on the second imaging sensor board 4. The optic center of the second lens 2 coincides with the optic center of the second imaging element 41.

During image fusion, the public region of the two images is retained, and the non-public regions of the two images are cropped.

When the optic axis position of the second lens 2 is adjusted, since the adjusting substrate 31 and the second imaging sensor board 4 use a shaft hole cooperation structure, due to the existence of a shaft hole cooperation gap, there is an included angle between the imaging images of the first imaging element 71 and the second imaging element 41. During image fusion, the public region area of the two images is much less than the area in an ideal state, resulting in more pixels that need to be cropped out.

Thus, to improve the resolution of the fused image as much as possible, the rotation angle of the first imaging element 71 and the second imaging element 41 needs to be corrected.

The positions of the first lens 1 and the first imaging element 71 are fixed. Rotation angle correction is only required for the second imaging element 41. Since the second imaging sensor board 4 is disposed on the front surface of the adjusting substrate 31, the adjusting substrate 31 is adjusted, so that the position of the second imaging element 41 may be adjusted.

To adjust the angle correction of the second imaging element 41, in this embodiment, referring to FIGS. 4 and 5, the adjusting assembly also includes a rotation adjusting assembly. The rotation adjusting assembly can enable the adjusting substrate 31 to rotate around the z-axis, so that the position of the second imaging element 41 may be adjusted.

The rotation adjusting assembly includes a rotating shaft 51. The rotating shaft 51 extends through the mount 10 and is connected to the first support pillar 311. The rotating shaft 51 extends in the z-axis direction. The first support pillar 311 can rotate around the rotating shaft 51. Thus, the adjusting substrate 31 can rotate around the rotating shaft 51, so that it is ensured that the adjusting substrate 31 rotates around the z-axis.

While adjusting the optic axis parallelism, the first support pillar 311 serves as a positioning pivot. While adjusting the rotation angle of the second imaging element 41, the first support pillar 311 serves as a rotating shaft. To take into account the preceding two effects, referring to FIG. 5, the rotating shaft 51 includes an optic axis portion 511, a stop portion 512, and a threaded shaft portion 513.

The periphery of the optic axis portion 511 is sleeved with a fastening elastic member 514. The stop portion 512 is disposed at one end of the optic axis portion 511, and the threaded shaft portion 513 is disposed at the other end of the optic axis portion 511. The optic axis portion 511 extends through the mount 10. The threaded shaft portion 513 is threadedly connected to the first support pillar 311, and the length of the threaded connection is adjustable. One end of the fastening elastic member 514 abuts against the stopper portion 512, and the other end of the fastening elastic member 514 abuts against the mount 10.

The fastening elastic member 514 is disposed. One end of the fastening elastic member 514 abuts against the stopper portion 512, and the other end of the fastening elastic member 514 abuts against the mount 10. Not only the first support pillar 311 can be reliably fastened, but also the friction area during rotation can be reduced.

In some embodiments of present application, referring to FIGS. 1 and 2, the rotation adjusting assembly also includes a mounting bracket 52, an adjusting cantilever 54, a rotation angle adjusting spring 55, and a tightening screw 53.

The mounting bracket 52 is fixedly mounted on the mount 10. The adjusting cantilever 54 is fixedly mounted on the adjusting substrate 31. The rotation angle adjusting spring 55 is disposed on the mounting bracket 52, and the rotation angle adjusting spring 55 can elastically be in contact with the lower surface of the adjusting cantilever 54 to drive the adjusting substrate 31 to rotate around the rotating shaft 51. The tightening screw 53 threadedly extends through the mounting bracket 52, and the lower end of the tightening screw 53 can be in contact with the upper surface of the adjusting cantilever 54. The extension length of the lower end of the tightening screw 53 relative to the mounting bracket 52 is adjusted, so that the abutment force between the tightening screw 53 and the adjusting cantilever 54 can be adjusted. Thus, the compression amount of the rotation angle adjusting spring 55 can be adjusted, so that the rotation angle of the optic axis of the second lens 2 around the z-axis direction is adjusted.

When the rotation angle of the second imaging element 41 needs to be adjusted, as shown in FIG. 2, the tightening screw 53 is loosened, and the tightening screw 53 moves upward, so that the adjusting cantilever 54 has a motion margin around the z-axis. Under the elastic force action of the rotation angle adjusting spring 55, the adjusting cantilever 54 moves around the z-axis, and then the adjusting substrate 31 is driven to rotate. In this manner, the rotation angle of the second imaging element 41 is adjusted.

In some embodiments of present application, the lower end of the tightening screw 53 is provided with a pointed corner. With this disposition, the contact between the tightening screw 53 and the adjusting cantilever 54 is point contact to prevent the adjusting cantilever 54 from being jammed in a rotation adjustment process.

In some embodiments of present application, the tightening screw 53 is a fine-pitch screw.

A pressing block 521 is disposed on the mounting bracket 52. The pressing block 521 is formed with a groove. The lower end of the rotation angle adjusting spring 55 abuts against the bottom surface of the groove. The pressing block 521 is mounted on the mounting bracket 52 through a pressing block fastening screw. The effective thread length of the pressing block fastening screw is greater than the initial length of the rotation angle adjusting spring 55, which facilitates the mounting of the pressing block 521.

In some embodiments of present application, the position of the tightening screw 53 and the position of the rotation angle adjusting spring 55 may be exchanged.

The adjusting cantilever 54 is formed with a first rotation angle stop waist-shaped hole 541. The mount 10 is provided with a first protrusion pillar that can rotate with the first rotation angle stop waist-shaped hole 541. When the adjusting substrate 31 rotates around the z-axis, and the side surface of the first protrusion pillar abuts against the end of the first rotation angle stop waist-shaped hole 541 in a long-axis direction, the adjusting cantilever 54 can no longer rotate, so that excessive rotation of the adjusting substrate 31 is avoided.

In some embodiments of present application, the adjusting substrate 31 is also provided with a limit cantilever 56. A second rotation angle stop waist-shaped hole 561 is formed on the limit cantilever 56. The mount 10 is provided with a second protrusion pillar that can rotate with the second rotation angle stop waist-shaped hole 561. When the adjusting substrate 31 rotates around the z-axis, and the side surface of the second protrusion pillar abuts against the end of the second rotation angle stop waist-shaped hole 561 in a long-axis direction, the limit cantilever 56 can no longer rotate, so that excessive rotation of the adjusting substrate 31 is avoided.

The first rotation angle stop waist-shaped hole 541 and the second rotation angle stop waist-shaped hole 561 are stop waist-shaped holes designed along the rotation trajectory of the adjusting substrate 31.

In the binocular camera provided in this embodiment, the position of the first lens 1 is fixed. The position of the optic axis of the second lens 2 is adjusted to adjust the relative parallelism of the optic axes of the two lenses. By adjusting the rotation angle of the imaging image of the second imaging element 41, the rotation degree of the image is adjusted. The relative parallelism of the optic axes of the first lens 1 and the second lens 2 can be adjusted to an ideal state, and the deviation of the rotation angles of the imaging images of the first imaging element 71 and the second imaging element 41 is zero. Thus, the consistency of imaging of the first lens 1 and the second lens 2 and the image fusion effect can be ensured.

After the adjusting operation of the camera lens module is completed, the adjustable components are dispensed and cured. Then, the camera lens module is assembled into a binocular camera housing, and subsequent software operations such as image fusion and clipping are executed in the entire product. Finally, fused images having high resolution, high brightness, and color information are generated.

The implementation process of fusion of two images of the binocular camera is below.

Step one: The optic center of the first lens 1 is adjusted to overlap the optic center of the first imaging element 71. The optic center of the second lens 2 coincides with the optic center of the second imaging element 41.

Step two: The fixed substrate 8 and the adjusting substrate 31 are mounted on the mount 10.

Step three: The relative parallelism of the optic axes of the first lens 1 and the second lens 2 is adjusted, and the rotation angle of the second imaging element 41 is adjusted.

Step four: The camera lens module is assembled into the binocular camera housing, two images are registered, cropped, and fused, and a fused image is output.

Figure 6:
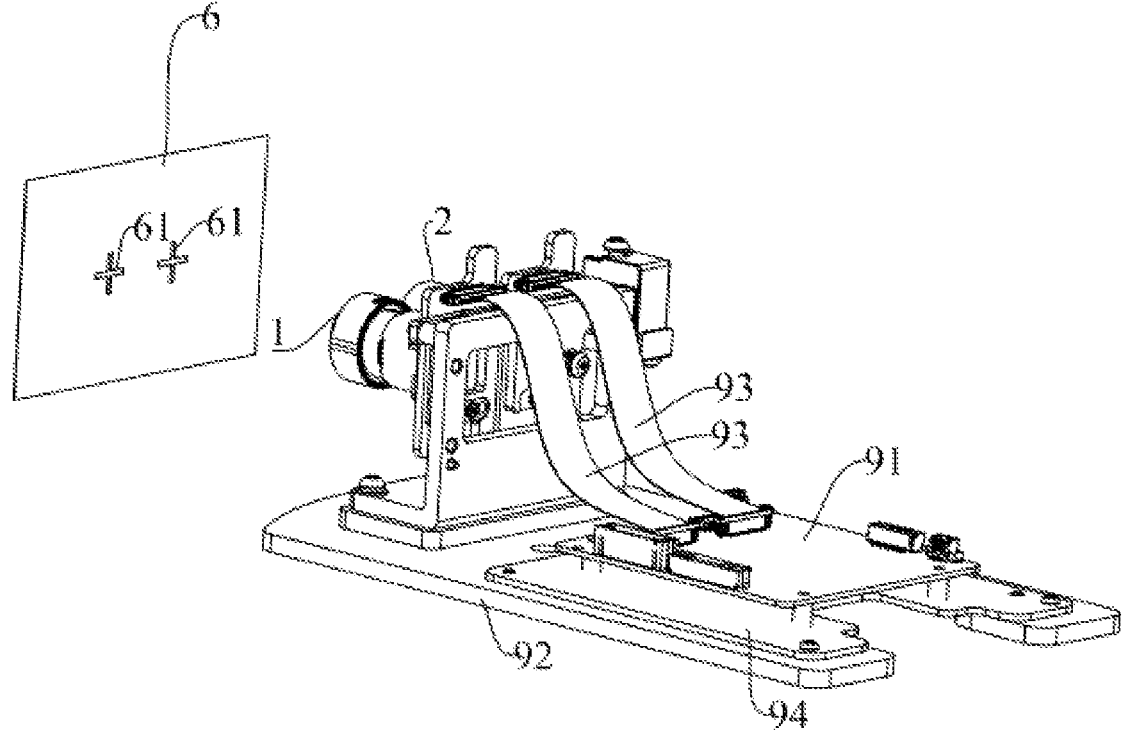
FIG. 6 is a view illustrating the structure of a camera lens optic axis adjusting device according to an embodiment of the present application.

Referring to FIG. 6, an embodiment provides a camera lens optic axis adjusting device. The device includes an adjusting reference member 6 and the camera lens module in the preceding embodiment. The camera lens module cooperates with the adjusting reference member 6 to adjust the optic axis positions of the first lens 1 and the second lens 2. Thus, the relative parallelism of the second lens 2 and the first lens 1 can be adjusted to ensure the imaging accuracy.

The adjusting reference member 6 is provided with two adjusting reference marks 61. The two adjusting reference marks 61 correspond to the first lens 1 and the second lens 2 respectively.

Illustratively, the adjusting reference member 6 is an adjusting drawing.

Illustratively, the camera lens optic axis adjusting device also includes a motherboard 91 and a fixed platform 92.

The first imaging sensor board 7 and the second imaging sensor board 4 communicate with the motherboard 91 through an FFC line 93. The external interface of the motherboard 91 accesses a Web terminal. In this manner, two images may be separately generated. A motherboard bracket 94 is disposed on the fixed platform 92. The motherboard 91 is mounted on the motherboard bracket 94.

In this embodiment, the adjusting reference marks 61 are cross holes and correspond to the cross marks disposed in the central regions of the two images. When the cross centers of the two images completely overlap with the two cross holes on the adjusting drawing, it indicates that the optic axes of the two lenses are completely parallel, and there is no included angle between the images. During image fusion, the area of the cropped region is minimized.

The two images and the two adjusting reference marks 61 on the adjusting reference member 6 are calibrated in sequence. First, the position of the adjusting reference member 6 is determined based on the image of the fixed first lens 1 and the adjusting reference mark 61 corresponding to the first lens 1 on the adjusting reference member 6. For example, the cross center of the image center of the first lens 1 completely overlaps with the cross hole corresponding to the first lens 1.

Then the second lens 2 is adjusted according to another adjusting reference mark 61 of the adjusting reference member 6. For example, the cross center of the image center of the second lens 2 is adjusted to overlap with the center of the cross hole corresponding to the second lens 2, which indicates that the two optic axes are parallel. Then, two cross lines of the image center of the second lens 2 are adjusted to completely overlap with two lines of the cross hole corresponding to the second lens 2, which indicates that there is no rotation angle between two imaging images. Finally, the optic axis of the second lens 2 is adjusted to be parallel to the optic axis of the first lens 1, and there is no rotation included angle between the rectangular image formed by the second lens 2 and the rectangular image formed by the first lens 1.

After the adjusting operation is completed, all the adjustable components are dispensed and cured. In this manner, the relative parallel positions of the first lens 1 and the second lens 2 may no longer change.

In some embodiments of the present application, referring to FIGS. 1 to 5, a camera lens module is provided. The camera lens module includes a mount 10, a first lens 1 connected the mount 10; and an adjusting mechanism, the adjusting mechanism includes an adjusting substrate 31 disposed on the mount 10 and an adjusting assembly for adjusting the adjusting substrate; the adjusting substrate 31 is provided with a second lens 2 on one side of the adjusting substrate 31 facing away from the mount 10, the second lens 2 is adjustably disposed on the mount 10 through the adjusting substrate 31, the second lens 2 and the first lens 1 are provided at intervals; the adjusting substrate 31 is provided with a first support pillar 311 on one side of the adjusting substrate 31 facing away from the second lens 2, the first support pillar 311 is connected to the mount 10.

Optionally, in the camera lens module, the adjusting assembly includes a pitching adjusting assembly. The pitching adjusting assembly includes a first adjusting structure 321 and a second adjusting structure 322, and the first support pillar 311 is located at one side of the first adjusting structure 321, and the second adjusting structure 322 is located at another side of the first adjusting structure 321 opposite to the one side of the first adjusting structure 321; the first adjusting structure 321 and the second adjusting structure 322 are both floatingly connected to the adjusting cantilever 54, and are capable of adjusting a pitch angle of the adjusting substrate 31 by adjusting a relative distance between the adjusting cantilever 54 and the mount 10.

Optionally, in the camera lens module, the first adjusting structure includes: a first adjusting support pillar 3211, a first adjusting connection member 3213 connected to the first adjusting support pillar 3211, and a first adjusting elastic member 3212 sleeved on the first adjusting support pillar 3211; the first adjusting support pillar 3211 is disposed on one side of the mount 10 facing the adjusting cantilever 54; the first adjusting connection member 3213 is capable of passing through the adjusting cantilever 54 to connect with the first adjusting support pillar 3211; one end of the first adjusting elastic member 3212 abuts against the mount 10, and another end of the first adjusting elastic member 3212 abuts against the adjusting cantilever 54; a gap exists between the adjusting cantilever 54 and an end surface of the first adjusting support pillar 3211 facing the adjusting cantilever 54; and the first adjusting connection member 3213, in cooperation with the first adjusting elastic member 3212 and the first adjusting support pillar 3211, is capable of performing adjustment of the pitch angle of the adjusting substrate 31 by adjusting the gap between the adjusting cantilever 54 and the first adjusting support pillar 3211.

Optionally, the adjusting substrate 31 is capable of rotating relative to the mount 10 with first support pillar 311 as a center; the adjusting assembly includes a rotation adjusting assembly for driving the adjusting substrate to rotate, the rotation adjusting assembly includes a tightening screw 53 and a rotation angle adjusting spring 55 disposed opposite to each other; the tightening screw 53 is provided on one side of the adjusting cantilever 54, a pointed corner of the tightening screw 53 is facing the adjusting cantilever 54. The tightening screw 53, when actuated, is capable of driving the adjusting cantilever 54 to drive the adjusting substrate 31 to rotate. The rotation angle adjusting spring 55 is provided on another side of the adjusting cantilever 54, and is capable of driving the adjusting cantilever 54 to drive the adjusting substrate 31 to rotate through the rotation angle adjusting spring 55 when the tightening screw 53 is actuated in a reverse direction.

Optionally, the adjusting mechanism further includes a rotating shaft 51 and a fastening elastic member 514 connected with each other; the rotating shaft 51 passes through the mount 10 and is threadedly connected to the first support pillar 311, and a length of a threaded connection formed by the rotating shaft 51 and the first support pillar 311 is adjustable; the fastening elastic member 514 is sleeved on the rotating shaft 51, and an end of the fastening elastic member 514 abuts against a stopper portion 512 of the rotating shaft 51, and another end of the fastening elastic member 514 abuts against one side of the mount 10 facing away from the first support pillar 311.

In the camera lens optic axis adjusting device provided in this embodiment, the relative parallelism of the optic axes of the first lens 1 and the second lens 2 and the rotation degree of the first imaging element 71 and the second imaging element 41 can be adjusted. Thus, the imaging consistency of the two lenses and the fusion effect are ensured, and the cropping region of the non-public region of the fused image is reduced. Moreover, the resolution of final imaging is improved.

After the adjusting operation is completed, all the adjustable components are dispensed and cured. In this manner, the relative parallel positions of the first lens 1 and the second lens 2 may no longer change. The adjusted camera lens module is placed in the housing of the binocular camera and accesses a system motherboard that may perform subsequent image registration, cropping, and fusion. Thus, the information of two images may be fused to form one full image, and the resolution of the formed image can reach the optimal state after the preceding adjustment.

What is claimed is:

1. A camera lens module, comprising:
   a mount;
   a first lens fixedly mounted on the mount, wherein an optic axis of the first lens extends in a z-axis direction;
   a second lens; and
   an adjusting mechanism comprising an adjusting substrate and a pitching adjusting assembly, wherein a first support pillar is disposed on a back surface of an end of the adjusting substrate, the first support pillar is connected to the mount, the second lens is fixedly disposed on a front surface of the adjusting substrate, the second lens and the first lens are disposed at intervals along an x-axis direction, an axis of the first support pillar and the optic axis of the first lens are disposed on a same z-axis, an optic axis of the second lens is collinearly disposed with the axis of the first support pillar, and another end of the adjusting sub-strate is connected to the mount in a floating manner through the pitching adjusting assembly and is config-ured to adjust a pitch angle of the optic axis of the second lens around an x-axis and a y-axis.

2. The camera lens module according to claim 1, wherein the pitching adjusting assembly comprises a first adjusting structure and a second adjusting structure, and the first support pillar, the first adjusting structure, and the second adjusting structure are disposed at intervals along the x-axis direction in sequence.

3. The camera lens module according to claim 2, wherein the first adjusting structure comprises:

a first adjusting support pillar fixedly disposed on the mount, wherein a gap exists between an end surface of the first adjusting support pillar and the adjusting substrate;

a first adjusting elastic member sleeving a periphery of the first adjusting support pillar, wherein one end of the first adjusting elastic member abuts against the mount, and another end of the first adjusting elastic member abuts against the adjusting substrate; and a first adjusting connection member connecting the adjusting substrate and the first adjusting support pillar and configured to adjust a distance between the end surface of the first adjusting support pillar and the adjusting substrate.

4. The camera lens module according to claim 1, further comprising a second imaging sensor board, wherein a sec-ond imaging element is disposed on the second imaging sensor board, the second imaging sensor board is disposed on the front surface of the adjusting substrate, and the second lens is fixedly disposed on the second imaging sensor board.

5. The camera lens module according to claim 4, further comprising a rotation adjusting assembly, wherein the rota-tion adjusting assembly comprises:

a rotating shaft extending through the mount and con-nected to the first support pillar, wherein the rotating shaft extends along the z-axis direction, and the first support pillar is configured to rotate around the rotating shaft.

6. The camera lens module according to claim 5, wherein the rotation adjusting assembly further comprises:

a mounting bracket fixedly disposed on the mount;

an adjusting cantilever fixedly disposed on the adjusting substrate;

a rotation angle adjusting spring disposed on the mount-ing bracket and capable of being elastically in contact with a lower surface of the adjusting cantilever, wherein the rotation angle adjusting spring is config-ured to drive the adjusting substrate to rotate around the rotating shaft; and a tightening screw threadedly extending through the mounting bracket, and a lower end of the tightening screw is capable of being in contact with an upper surface of the adjusting cantilever.

7. The camera lens module according to claim 6, wherein the lower end of the tightening screw is provided with a pointed corner.

8. The camera lens module according to claim 6, wherein the adjusting cantilever is provided with a first rotation angle stop waist-shaped hole, and the mount is provided with a first protrusion pillar that rotates with the first rotation angle stop waist-shaped hole.

9. The camera lens module according to claim 5, wherein the rotating shaft comprises:

an optic axis portion, wherein a periphery of the optic axis portion is sleeved with a fastening elastic member; and a stop portion disposed at an end of the optic axis portion; and a threaded shaft portion disposed at another end of the optic axis portion, wherein the optic axis portion extends through the mount; the threaded shaft portion is threadedly connected to the first support pillar, and a length of a threaded connection formed by the threaded shaft portion and the first support pillar is adjustable; and an end of the fastening elastic member abuts against the stopper portion, and another end of the fastening elastic mem-ber abuts against the mount.

10. A camera lens optic axis adjusting device, comprising:
a camera lens module; and
an adjusting reference member provided with two adjust-ing reference marks, wherein the two adjusting refer-ence marks correspond to the first lens and the second lens of the camera lens module respectively;
wherein the camera lens module comprises:
a mount;
a first lens fixedly mounted on the mount, wherein an optic axis of the first lens extends in a z-axis direction;
a second lens; and
an adjusting mechanism comprising an adjusting sub-strate and a pitching adjusting assembly, wherein a first support pillar is disposed on a back surface of an end of the adjusting substrate, the first support pillar is connected to the mount, the second lens is fixedly disposed on a front surface of the adjusting substrate, the second lens and the first lens are disposed at intervals along an x-axis direction, an axis of the first support pillar and the optic axis of the first lens are disposed on a same z-axis, an optic axis of the second lens is collinearly disposed with the axis of the first support pillar, and another end of the adjusting sub-strate is connected to the mount in a floating manner through the pitching adjusting assembly and is config-ured to adjust a pitch angle of the optic axis of the second lens around an x-axis and a y-axis.

11. A camera lens module, comprising:
a mount;
a first lens connected the mount; and
an adjusting mechanism, wherein the adjusting mecha-nism comprises an adjusting substrate disposed on the mount and an adjusting assembly for adjusting the adjusting substrate;
the adjusting substrate is provided with a second lens on one side of the adjusting substrate facing away from the mount, the second lens is adjustably disposed on the mount through the adjusting substrate, the second lens and the first lens are provided at intervals;
the adjusting substrate is provided with a first support pillar on one side of the adjusting substrate facing away from the second lens, the first support pillar is con-nected to the mount.

12. The camera lens module according to claim 11, wherein the adjusting assembly comprises a pitching adjust-ing assembly;
wherein the pitching adjusting assembly comprises a first adjusting structure and a second adjusting structure, and the first support pillar is located at one side of the first adjusting structure, and the second adjusting struc-ture is located at another side of the first adjusting structure opposite to the one side of the first adjusting structure;

wherein the first adjusting structure and the second adjusting structure are both floatingly connected to an adjusting cantilever, and are capable of adjusting a pitch angle of the adjusting substrate by adjusting a relative distance between the adjusting cantilever and the mount.

13. The camera lens module according to claim 12, wherein the first adjusting structure comprises:

a first adjusting support pillar, a first adjusting connection member connected to the first adjusting support pillar, and a first adjusting elastic member sleeved on the first adjusting support pillar;

wherein the first adjusting support pillar is disposed on one side of the mount facing the adjusting cantilever;

the first adjusting connection member is capable of passing through the adjusting cantilever to connect with the first adjusting support pillar;

one end of the first adjusting elastic member abuts against the mount, and another end of the first adjusting elastic member abuts against the adjusting cantilever;

a gap exists between the adjusting cantilever and an end surface of the first adjusting support pillar facing the adjusting cantilever; and the first adjusting connection member, in cooperation with the first adjusting elastic member and the first adjusting support pillar, is capable of performing adjustment of the pitch angle of the adjusting substrate by adjusting the gap between the adjusting cantilever and the first adjusting support pillar.

14. The camera lens module according to claim 13, wherein the adjusting mechanism further comprising a rotating shaft and a fastening elastic member connected with each other;

wherein the rotating shaft passes through the mount and is threadedly connected to the first support pillar, and a length of a threaded connection formed by the rotating shaft and the first support pillar is adjustable;

the fastening elastic member is sleeved on the rotating shaft, and an end of the fastening elastic member abuts against a stopper portion of the rotating shaft, and another end of the fastening elastic member abuts against one side of the mount facing away from the first support pillar.

15. The camera lens module according to claim 12, wherein the adjusting mechanism further comprising a rotating shaft and a fastening elastic member connected with each other;

wherein the rotating shaft passes through the mount and is threadedly connected to the first support pillar, and a length of a threaded connection formed by the rotating shaft and the first support pillar is adjustable;

the fastening elastic member is sleeved on the rotating shaft, and an end of the fastening elastic member abuts against a stopper portion of the rotating shaft, and another end of the fastening elastic member abuts against one side of the mount facing away from the first support pillar.

16. The camera lens module according to claim 11, wherein the adjusting substrate is capable of rotating relative to the mount with first support pillar as a center;

the adjusting assembly comprises a rotation adjusting assembly for driving the adjusting substrate to rotate, the rotation adjusting assembly comprising a tightening screw and a rotation angle adjusting spring disposed opposite to each other;

the tightening screw is provided on one side of the adjusting cantilever, a pointed corner of the tightening screw is facing the adjusting cantilever, and the tightening screw, when actuated, is capable of driving the adjusting cantilever to drive the adjusting substrate to rotate;

the rotation angle adjusting spring is provided on another side of the adjusting cantilever, and is capable of driving the adjusting cantilever to drive the adjusting substrate to rotate through the rotation angle adjusting spring when the tightening screw is actuated in a reverse direction.

17. The camera lens module according to claim 16, wherein the adjusting mechanism further comprises a rotating shaft and a fastening elastic member connected with each other;

wherein the rotating shaft passes through the mount and is threadedly connected to the first support pillar, and a length of a threaded connection formed by the rotating shaft and the first support pillar is adjustable;

the fastening elastic member is sleeved on the rotating shaft, and an end of the fastening elastic member abuts against a stopper portion of the rotating shaft, and another end of the fastening elastic member abuts against one side of the mount facing away from the first support pillar.

18. The camera lens module according to claim 11, wherein the adjusting mechanism further comprises a rotating shaft and a fastening elastic member connected with each other;

wherein the rotating shaft passes through the mount and is threadedly connected to the first support pillar, and a length of a threaded connection formed by the rotating shaft and the first support pillar is adjustable;

the fastening elastic member is sleeved on the rotating shaft, and an end of the fastening elastic member abuts against a stopper portion of the rotating shaft, and another end of the fastening elastic member abuts against one side of the mount facing away from the first support pillar.

19. The camera lens module according to claim 11, wherein an end of the first support pillar in contact with the mount is provided with a chamfer.

* * * * *